Aug. 25, 1936.  J. M. G. FULLMAN  2,052,394
OUTLET BOX CONNECTER
Filed May 13, 1935  2 Sheets-Sheet 1
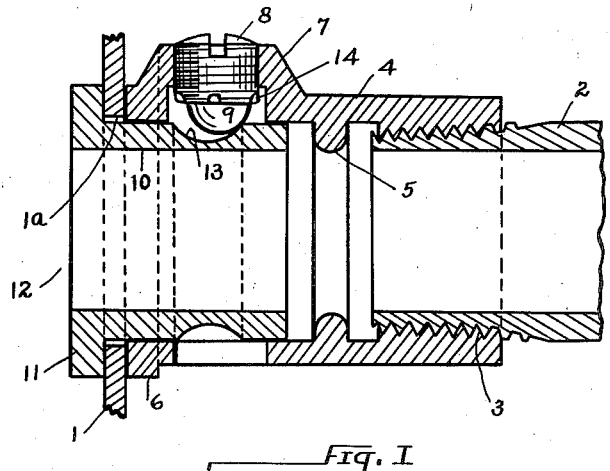
Fig. I
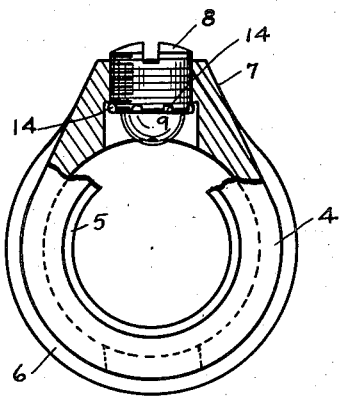
Fig. II
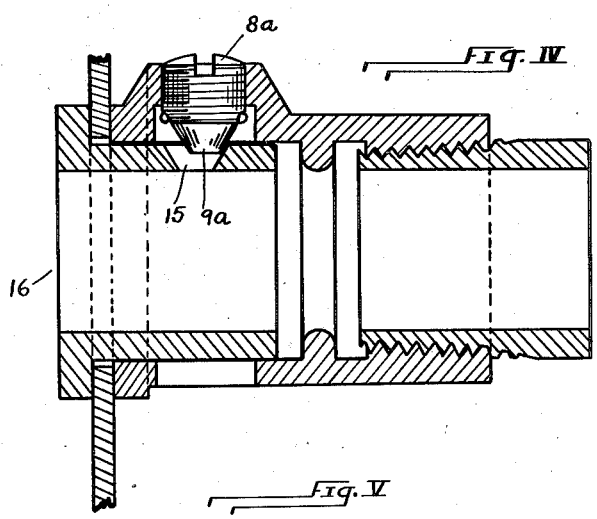
Fig. IV
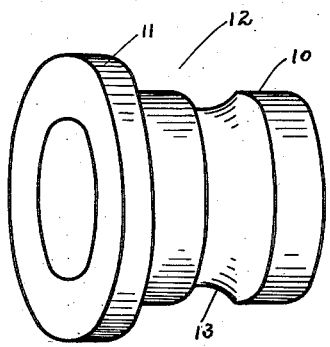
Fig. III
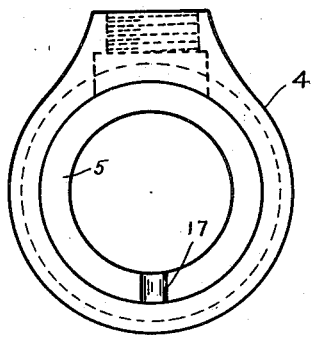
Fig. V
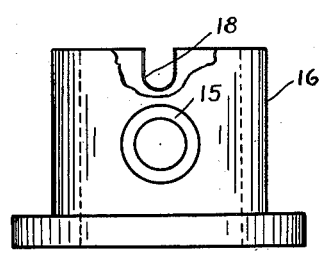
Fig. VI
INVENTOR
James M. G. Fullman
by Christy and Wharton
attorneys

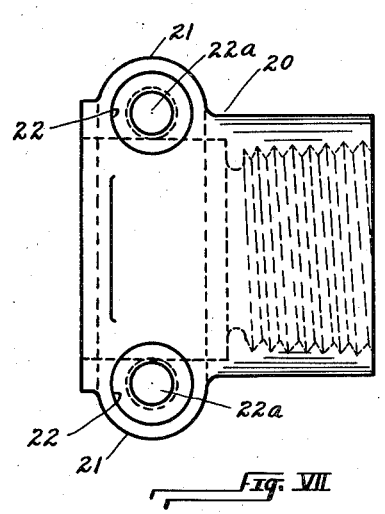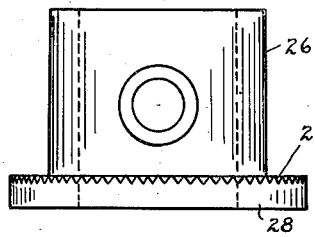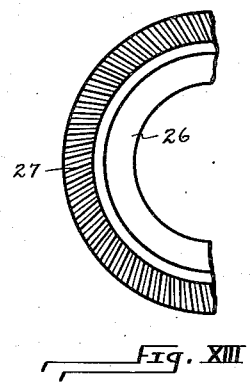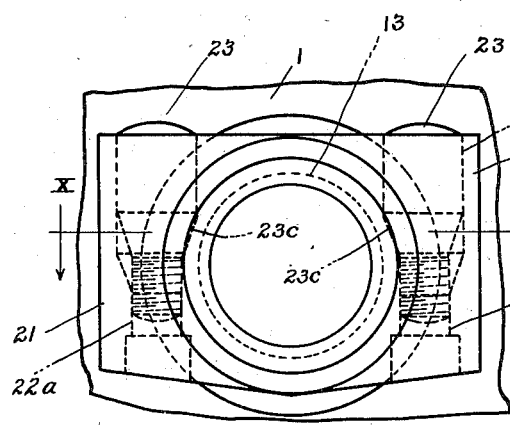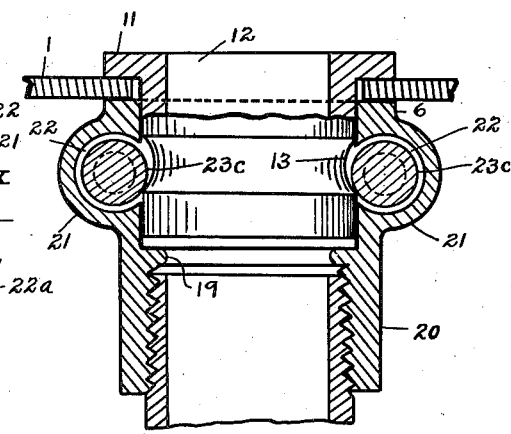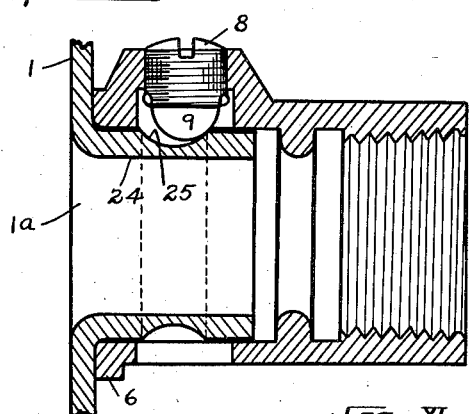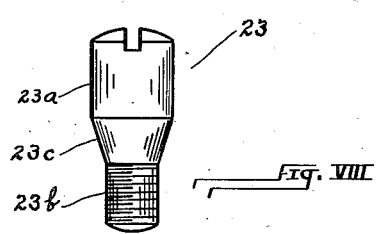

Patented Aug. 25, 1936

2,052,394

UNITED STATES PATENT OFFICE 2,052,394

OUTLET BOX CONNECTER

James M. G. Fullman, Sewickley, Pa., assignor to National Electric Products Corporation, a corporation of Delaware Application May 13, 1935, Serial No. 21,109

3 Claims. (Cl. 247—25)

This invention relates to a connecter structure for interconnecting an electrical conduit to an outlet box.

In electrical wiring, outlet boxes are used to contain conductor splices, and for the mounting and electrical connection of devices, fixtures, fuses, switches, and other electrical equipment. The wire into and from such boxes is carried in conduits, or cables, which commonly are rigid, or flexible, metal conduits, or metallic armoured cable. It is necessary that the wiring carried in the conduits be securely held to the outlet box, and also that the conduits, or metal armour, be properly bonded to the metallic box, so that a continuous and adequate electrical path for properly grounding the installation is provided.

There are two well-known modes of making connection with the outlet boxes, in installing such metallic wiring systems. In one mode of connection, the outlet boxes have threaded hubs, into which are directly screwed terminally threaded conduits. Cables are attached to such outlet boxes by means of threaded connecters which may be screwed into the hubs. Such mode of outlet box connection provides a connection which is positive, and grounding which is adequate, but under certain conditions presents difficulty in making the connection during installation of the system. Since the connection is made by relative rotation between the outlet box and a conduit, or cable connecter, it follows that one or the other of the elements must be free in order that connection may be made. Such is not always the case, and the use of troublesome and expensive unions is often, therefore, necessary.

The other common mode of interconnecting conduits and armoured cables with outlet boxes, is to use apertured outlet boxes, such as "knockout" boxes, and to utilize lock nuts and bushings in making the connection. According to this mode of connection, a conduit is connected with an outlet box by running back a lock nut on a threaded terminal of the conduit, and inserting the threaded terminal, lying beyond the lock nut, through the aperture in the outlet box. A bushing is then applied to the conduit, lying inwardly of the box, and the lock nut is brought up to engage the wall of the outlet box between itself and the bushing on the conduit. In similarly engaging cables to an outlet box, the cables have terminally attached thereto a connecter with a threaded neck, and a shoulder at the base of the neck arranged to bear against the outer wall of the outlet box when the threaded neck is inserted thereinto through an aperture in the outlet box wall. By application of a lock nut to the threaded neck of the connecter, the wall of the outlet box may be clamped between the lock nut and the shoulder on the connecter. While the outlet box and the conduit, or cable, need not be turned relatively to each other in making such connection, such connection provides a very poor path to ground between metal of the conduit, or cable, and the metal body of the box, unless the engagement between the connecter and the outlet box be made extremely tight. If, therefore, great care in obtaining a tight connection is not exercised, or if the connection be loosened subsequently, as by vibrations, the system is inadequately grounded at the connection between the outlet box and the conduit, or cable.

The object of my invention is to provide connection between a metallic conduit, or cable, and a metallic outlet box, which may be installed without relative turning movement between the conduit, or cable, and the outlet box, and which provides a mechanical and electrical connection between the outlet box and the conduit, or cable, which may easily be made firm and adequate, and which is proof against the loosening effect of jars and vibrations.

In the accompanying drawings Fig. I is a central, longitudinal section, through my improved connecter, illustrating the connection of a rigid conduit to an outlet box.

Fig. II is a view showing the outer element of my connecter, partly in end elevation, and partly in section, illustrating the mounting of a locking screw in the outer element of the assembly.

Fig. III is an isometric view of the inner element of my connecter.

Fig. IV is a fragmentary, longitudinal, sectional view, showing a modification in the means for interlocking the inner and outer elements of my connecter.

Fig. V is an end elevation of the outer connecter element, showing guiding means added thereto to cooperate with guide means on an inner connecter element constructed generally in accordance with the showing of Fig. IV.

Fig. VI is a plan view of an inner connecter element made generally in accordance with the showing of Fig. IV, but provided with guiding means cooperative with the guiding means on the outer connecter element, as shown in Fig. V.

Fig. VII is a plan view of a still further modified form of the outer element of my connecter.

Fig. VIII is a detail elevation of a form of locking screw suitable for use in conjunction with the outer connecter element, shown in Fig. VII.

Fig. IX is an end elevation of an installation employing the outer element illustrated in Fig. VII.

Fig. X is a cross-sectional view, taken on the line X—X of Fig. IX, but showing both the inner and outer elements of my connecter in assembly position, with the locking screws of Fig. VIII mounted to interchange the elements.

Fig. XI is a longitudinal, sectional view, illustrating the formation of the inner element of my connecter formed as an integral portion of the outlet box, the showing of this inner connecter element, and the outer connecter element associated with it, being otherwise in accordance with the showing of Fig. I.

Fig. XII is a plan view of a modified form of inner connecter element, having in the outlet box contacting region thereof means for resisting turning movement of the connecter element relatively to the outlet box.

Fig. XIII is a fragmentary elevation of the inner connecter element shown in Fig. XII, looking toward the means for resisting turning movement of the connecter element.

Referring initially to Figs. I, II, and III of the drawings, reference numeral 1 designates the wall of an outlet box, to which the threaded terminal of a rigid conduit 2 is to be connected. The outer element 4 of my connecter is of generally tubular form, and is interiorly threaded in the rearward region 3 thereof for reception of the threaded terminal of conduit 2. Interiorly of element 4, at the forward extremity of the threading therein, there is provided an annular shoulder 5 against which the forward edge of the conduit may abut. At its forward end, connecter element 4 is provided with an annular flange 6, which may seat against the wall 1 of an outlet box, to surround an opening 1a therethrough.

In its region lying forwardly of interior shoulder 5, connecter element 4 has thereon a diametrically extended boss 7, which is interiorly threaded to receive a locking screw 8. Locking screw 8 has at its inner end a rounded unthreaded portion 9, adapted in the assembly to cooperate in providing a wedging effect, which will be described. The inner element of my connecter comprises a rearward, tubular portion 10, which has at the forward terminal thereof a peripheral flange 11. This element, designated generally by reference numeral 12, is adapted to be projected outwardly through the opening 1a in the wall of the outlet box, with its rearward tubular portion surrounded by the wall of the outlet box, and with its flange 11 bearing against the inner surface of the outlet box wall in a zone surrounding the opening.

The wall of rearward tubular portion 10 of the member 12 is provided with a recess in the form of a peripheral groove 13, which is of curved contour, and which desirably has a greater radius of curvature than that on which the rounded terminal 9 of the set-screw 8 is formed. The elements are so designed, with respect to each other, and with respect to the thickness of an outlet box wall to be embraced between flange 6 on the outer connecter element and flange 11 on the inner connecter element, that in telescopic assembly the rounded terminal 9 of the locking screw, and the rounded groove 13 in the tubular wall of element 12, lie in cooperative relation to each other, but with the center of the rounded screw terminal 9 lying to the rear of the center line of the groove. By reference to Fig. I of the drawings, it will be seen that this off-center relation causes the locking screw 8 to exert a wedging action on the inner element 12, for pulling it rearwardly, when the locking screw is caused to move radially of the assembled elements 4 and 12.

The connection between outlet box wall 1 and conduit 2, shown in Fig. I, may be made in either of two ways. According to one manner of procedure, the outer connecter element 4 may first be screwed to the threaded terminal of the conduit, and the inner element 12 may be projected outwardly through the opening in the outlet box wall. With the locking screw 8 in radially retracted position, the two connecter elements are brought into telescopic relation. Screw 8 is then moved radially inward, thereby to exert on the groove 13 of element 12 a wedging effect, which draws the peripheral flange 11 of the inner element firmly against the inner face of the outlet box wall.

An optional manner of making the connection, is to first make telescopic assembly between the two connecter elements, with the screw 8 in radially retracted position, but projecting radially inward a sufficient distance to lie within the groove 13. The elements are thus loosely interconnected, and the outer element 4, being free to turn, may be screwed onto the threaded terminal of the conduit. The screw 8 may be then run radially inward to exert its wedging effect in groove 13, thereby to draw the inner element 12 rearwardly into firm contact with the inner face of the outlet box wall.

It will be noted that, in making the connection in either manner described, it is unnecessary that either the conduit or the outlet box be rotated.

It is desirable that locking screw 8 remain permanently positioned in the boss 7 of outer connecter element 4. To this end, the lowermost turn of the thread on screw 8 is desirably bruised at intervals 14. These bruised spots on the lowermost turn of the screw thread prevent the screw from being run out of the threaded bore in which it engages. By provision of an adequate length of uninterrupted thread, between the innermost wedging position of the screw and its outermost position for releasing the inner element 12, the screw may remain fully operative for its intended purpose, while being permanently mounted in its bore.

Figs. IV, V, and VI of the drawings illustrate a modification in the connection, which is, however, substantially unaffected in function, and is but slightly changed in structure from the showing of Figs. I, II, and III of the drawings. Referring to Fig. IV, the locking screw 8a has its inwardly directed terminal 9a made frusto-conical, rather than rounded. In this form of the connecter, the frusto-conical terminal 9a of the screw cooperates with a recess 15, in the form of an inwardly tapered aperture, in the inner element 16. As seen in Fig. IV, the frusto-conical terminal 9a of the screw is, in assembly, off-center with respect to aperture 15 of the inner element. Movement of the screw radially inward, therefore, produces between the elements a wedging action similar to that caused by the off-center arrangement of the terminal 9 of screw 8, with the groove 13 in inner connecter element 12. As shown in Fig. IV, outer connecter element 4 is identical in structure with the showing of Figs. I and II.

Figs. V and VI of the drawing show both inner and outer connecter elements which are closely similar to the corresponding elements as shown in Fig. IV, but which show additionally means for aligning the terminal of screw 8a and the aperture 15 of the inner connecter element, in making the conduit-connecting assembly. Such means comprises a boss 17, which projects from the annular shoulder 5 and radially from the inner face of outer connecter element 4. This positioning boss 17 cooperates with a slot 18 extending forwardly from the rearward edge of inner connecter element 16, the wall portion of the element in diametric alignment with the tapered aperture 15 therein. In making the assembly, the matching of slot 18 with positioning boss 17 serves properly to position the opening 15 with respect to the cooperative terminal 9a of the locking screw.

In making connection to an outlet box, using an inner connecter element as shown in Figs. IV, V, and VI, the connection is made similarly to that described in connection with the arrangement of Figs. I and II, save when a loose assembly of the connecter elements precedes screwing the connecter to the conduit. In this latter instance, the entire assembly is rotated relatively to the outlet box and to the conduit. This is necessary because the projection of screw 8a into the aperture 15 of the inner connecter element prevents relative turning movement between the elements 4 and 16 when even loose connection is made.

Figs. VII to X, inclusive, of the drawings show a still further modified connecter assembly. The inner connecter element 12 may, in this modified form of the assembly, be unchanged. Also, the rearward portion of the outer connecter element 20, including the intermediate rib 19, may be identical with, or closely similar to, the corresponding portion of the outer connecter element 4. The forward region of the outer connecter element 20 is, however, modified to provide for the mounting of two locking screws, and these locking screws differ substantially in detail from either of the locking screws 9 or 9a.

Referring to these figures of the drawings, it will be seen that the outer connecter element 20 is provided with two transversely aligned bosses 21, having therein bores 22 unthreaded throughout their region of greater diameter. The bosses 21 are discontinuous radially inward of the structure, throughout their region of greater diameter, in manner to permit elements of circular cross section, housed within the bosses, to extend into the bore of the outer connecter element throughout a portion of their peripheries. A constricted portion 22a of each of the bores 22 is threaded.

The locking screws 23, associated with this modified form of outer connecter element, each comprises an upper portion 23a, which is of a diameter substantially that in the unthreaded region of bore 22; and a lower threaded region 23b, which is adapted to have a screw engagement in the threaded region 22a of one of the bores 22. An intermediate portion 23c of the screw tapers downwardly from a diameter equal to that of the portion 23a to a diameter equal to that of the threaded portion 23b.

In assembly, the tapered regions 23c of the screws 23 contact the inner connecter element 12 at the region of the peripheral groove 13 therein. In this modification, also, the relative positioning of the parts is such that the screws and the groove are off center with respect to each other, with the tapered regions of the screws bearing against the rearward wall of the groove. Referring to Fig. IX of the drawings, it will be seen that the tapered regions 23c of the screws contact the inner element 12 upwardly, or outwardly, of the horizontal, central diameter of the inner element, as the assembly is shown in this figure of the drawings. When, therefore, the screws are moved downwardly, as viewed in Fig. IX, they exert on the inner element 12 a wedging force tending to move it rearwardly.

In all the figures of the drawings the tightening effect is obtained by the wedging action of threaded members, which are movable transversely of the assembly. It should be understood that the wedging force, which tends to draw the inner connecter element rearwardly and away from the wall of the outlet box, reacts to force the outer connecter element against the outer surface of the outlet box wall. The connecter thus firmly engages the outlet box wall 1 between the flange 6 on the outer connecter element, and the flange 11 on the inner connecter element. This produces an engagement providing adequate grounding of the conduit, or cable, as well as good mechanical connection of the conduit, or cable to the outlet box.

The provision of frictionally engaging, positively positioned means acting to clamp the assembly to the outlet box, gives assurance against loosening of the assembly from engagement with the outlet box, by subjection to shocks and vibrations.

In the modification shown in Fig. XI of the drawings, outer connecter 4 may be identical in all respects with such element as it is shown in Figs. I, II and IV of the drawings. In this modification, however, the outlet box wall 1 has formed integrally therewith, as by drawing or by welding, a ferrule or hub 24 surrounding the opening 1a in the outlet box wall, which performs the function of the inner element 12 as shown in the preceding figures of the drawings. The wedging indentation of hub 24 may be either in the form of a peripheral groove of curved cross-sectional contour, as shown in Fig. III, or may be a recess with radial inwardly convergent walls, as shown in Figs. IV and VI. As shown, hub 24 has therein a peripheral groove 25, similar to the peripheral groove 13 of Fig. III. In this modification the connecter functions in the same manner as in the connecter forms previously described. The hemispherical terminal 9 of screw 8, lying to the rear of a center line of groove 25, exerts upon the hub 24 a rearward pull, which forces the flange 6 of the outer connecter element 4 firmly against the outer surface of the outlet box wall.

The modification of Figs. XII and XIII shows an inner connecter element 26, which carries means 27 for resisting turning movement of the connecter element relatively to the outlet box wall. As shown, these means for resisting turning movement comprise teeth 27, which are arranged around the circuit of flange 28, on its rearward face which is presented to the inner surface of the outlet box wall. The function of teeth 27 is to resist turning movement of inner connecter element when it is drawn up closely to engage the wall of the outlet box. It is to be understood that, if desired, means for resisting turning, such as the teeth 27, may be formed on the inner wall of the outlet box instead of on the flange of the inner connecter element. Further, means for resisting turning movement relatively to the outlet box may be introduced additionally or alternatively in the region in which the flange of the outer connecter element abuts the outer surface of the outlet box.

While the modification of Figs. XII and XIII is shown as applied to the inner connecter element of Fig. IV, it should be understood that it may be applied to an inner connecter element, as shown in any of Figs. I to X inclusive, of the drawings. It is, however, of greatest utility as used with the inner connecter element of Figs. IV, V, and VI. This is for the reason that, when an inner connecter element as therein shown is used, turning of the inner connecter element, after assembly connection has been made, also causes turning of the outer connecter element to which the conduit is directly threaded.

It will be readily understood that if an armoured cable, rather than a rigid conduit, is to be connected to an outlet box, the cable may simply be provided terminally with a threaded ferrule for engaging the outer tubular element of the connecter. Throughout the claims, therefore, the simple term "conduit" will be used as descriptive of the connection of either rigid or flexible metal conduits, or armoured cable, to an outlet box.

The drawings and specification show and describe what I consider preferred construction and modifications, but it is obvious that changes in structural details may be made without departing from the scope of the invention. For example, to one skilled in the art it would be possible to mount the wedging screw, or other suitable form of wedge, in the inner connecter element, rather than in the outer connecter element, while providing for movement of the wedging element transversely of the assembly.

Also in the modifications of the device utilizing a tapered hole, or circular indentation, to produce wedging action with the terminal of the wedging screw, it is possible to provide accommodation to different thickness in the walls of outlet boxes engaged by the elements of the connecter structure. This may be done merely by spacing two or more tapered holes about the periphery of the inner connecter element, spacing their centers slightly different distances from the adjacent face of the inner element collar. Desirably, then, each tapered hole is provided with its individual guiding notch for cooperation with a guiding lug on the outer connecter element.

I claim as my invention:

1. A connecter assembly for engaging an electrical conduit to an outlet box comprising an inner tubular element adapted to be projected through an opening in the wall of an outlet box and at one terminal formed to contact the inner surface of the outlet box wall adjacent the opening therein, an outer tubular element threaded terminally for engagement of a conduit and adapted in assembly telescopically to surround the inner tubular element, a screw mounted in one of said tubular elements for linear movement transversely of the assembly, a recess in the wall of the other of said tubular elements disposed for cooperative relation with said screw in the connecter assembly, said screw and said recess having cooperatively tapered surfaces adapted upon movement of the screw inwardly of its mounting and transversely of the assembly to produce a wedging effect tending to move the inner and outer connecter elements in opposite directions longitudinally of the assembly thereby to engage the outlet box wall therebetween.

2. A connecter assembly for engaging an electrical conduit to an outlet box wall comprising a tubular inner element adapted to be projected through an opening in the wall of an outlet box and at one terminal formed to contact the inner surface of the outlet box wall adjacent the opening therein, a conduit-engaging element adapted telescopically to surround said inner tubular element, a screw mounted in said outer connecter element for linear movement transversely of the assembly, said screw being formed terminally to present an inclined surface to said tubular inner element, and a recess in the wall of said tubular inner element in the form of a circular aperture having a surface inclined cooperatively with the inclined surface of the said screw, said screw and said recess being relatively so arranged in assembled condition of the two said elements that the wedging effect produced by movement of the screw toward the inner element tends to move the two elements in opposite directions longitudinally of the assembly thereby to engage the outlet box wall therebetween.

3. A connecter assembly for engaging an electrical conduit to an outlet box wall which comprises a tubular inner element projected from an outlet box wall at an opening therein, a tubular conduit-engaging element adapted telescopically to surround said inner tubular element, a screw mounted in one of said tubular elements for linear movement transversely of the assembly, a recess in the wall of the other of said tubular elements disposed for cooperative relation with said screw in the connecter assembly, said screw and said recess having cooperatively tapered surfaces adapted upon movement of the screw transversely of the assembly to produce a wedging effect tending to move the inner and outer elements in opposite directions longitudially of the assembly thereby to force the said outer tubular element against the outlet box wall.

JAMES M. G. FULLMAN.